US012776695B2

(12) United States Patent
Tsai et al.

(10) Patent No.: US 12,776,695 B2
(45) Date of Patent: Oct. 27, 2026

(54) SELF-SUBTRACTED CURRENT SENSOR FOR CONVERSION UNIT

(71) Applicant: National Taiwan University, Taipei (TW)

(72) Inventors: Chieh-Ju Tsai, Taipei City (TW); Hsiao-Hsuan Chen, Taipei City (TW); Ching-Jan Chen, Taipei City (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 161 days.

(21) Appl. No.: 18/804,165

(22) Filed: Aug. 14, 2024

(65) Prior Publication Data

US 2025/0330078 A1 Oct. 23, 2025

(30) Foreign Application Priority Data

Apr. 22, 2024 (TW) ................................ 113114962

(51) Int. Cl.
*H02M 1/00* (2006.01)
*H02M 3/158* (2006.01)

(52) U.S. Cl.
CPC ......... *H02M 1/0009* (2021.05); *H02M 3/158* (2013.01)

(58) Field of Classification Search
CPC .... H02M 3/156; H02M 3/158; H02M 1/0009; H02M 1/0025; H02M 3/1584; H02M 1/08; H02M 3/1582; H02M 1/0058; H02M 3/1566; H02M 1/0003; H02M 1/32; H02M 3/33507; H02M 1/0038; H02M 3/33584; H02M 1/0006; H02M 1/0022; H02M 3/137; H02M 3/33546; H02M 1/0045; H02M 1/0083; H02M 1/10; H02M 1/385; G06F 2119/02; G06F 17/18; G01R 19/0092; G01R 31/00; G01R 19/00; G01R 19/16538; G01R 19/16571; G01R 19/16576; G01R 17/02
See application file for complete search history.

(56) References Cited

U.S. PATENT DOCUMENTS 6,600,298 B2 * 7/2003 McDonald ............ H02M 3/156 323/285
6,683,441 B2 * 1/2004 Schiff ................. H02M 3/1584 323/224
7,251,113 B1 * 7/2007 Batarseh ............... H02M 3/158 361/111
8,120,346 B2 * 2/2012 Ostrom ................. H02M 3/156 323/283
10,644,598 B1 * 5/2020 Lewinski Komincz ..................... H02M 1/08
2004/0217744 A1 * 11/2004 Walters ............... H02M 3/1588 323/277

* cited by examiner

*Primary Examiner* — Vinh P Nguyen
(74) *Attorney, Agent, or Firm* — BACON & THOMAS, PLLC

(57) ABSTRACT

A self-subtracted current sensor is used to sense the conversion unit without using a bulky matching filter, also, improves the current sharing accuracy. The sensor maintains the balance of current between phases, prevents overcurrent, and enhances the stability and reliability of the system.

9 Claims, 3 Drawing Sheets

SELF-SUBTRACTED CURRENT SENSOR FOR CONVERSION UNIT

BACKGROUND OF THE INVENTION

1. Field of the Invention

The present invention relates to a self-subtracted current sensor, particularly to a self-subtracted current sensor with smaller size and higher current balance accuracy.

2. Description of the Prior Art

Current sensing is based on Ohm's law, when current flows through a resistor, a voltage difference is generated across the resistor, resulting in a voltage value. The current value passing through the resistor is sensed by dividing this voltage value by the resistance.

Current sensing is crucial for buck converters, especially in multiphase configurations, to ensure current balance between phases, prevent overcurrent, and enhance system stability and reliability. Various current sensing methods can be used, such as series resistors current sense, DCR current sensing, MOS current mirror sensing, and switch node ($V_{LX}$) filtering.

However, series resistors current sense causes power loss, DCR current sensing faces integration challenges which requires filters with low-frequency poles and temperature compensation, MOS current mirror sensing has limitations in wide input voltage ranges, and currently lacks complete waveform information.

Additionally, switch node ($V_{LX}$) filtering aims to enhance phase current balancing in multiphase buck converters by subtracting the average value of the switch node ($V_{LX}$) filtering from the output voltage, addressing issues with off-chip filtering resistor-capacitor (RC) circuits. However, challenges persist, especially in applications, wherein, the sensing gain is equal to the direct current resistance (DCR), leading to accuracy and temperature coefficient issues in multiphase current balance applications.

In view of the aforementioned issues, the industry is currently looking forward to the development of a new type of on-chip current sensor, which can effectively eliminate the aforementioned issues.

SUMMARY OF THE INVENTION

The present invention is a self-subtracted RLG current sensor (SSRLGCS), which also is a self-subtracted current sensor applied to use in monolithic multiphase buck converters.

A self-subtracted current sensor of the present invention is used to sense a conversion unit, a switching node, a sensing inductor, and a sensing resistor. The switching node is connected to the conversion unit, the sensing inductor is connected to the switching node, and the sensing resistor is connected to the sensing inductor and the conversion unit. Wherein, the sensing gain can be generated by subtracting the product of the duty cycle and the input voltage from the switching node. And, by adjusting the filter crossover frequency, the full waveform or direct current information of the inductor current can be effectively extracted, promoting modulation or phase current balance. It can also accurately match the on-resistance of upper and lower power switches, ensuring accurate inductor current extraction without the need for bulky matching filters, and improving current balance accuracy. Current detection is crucial in buck converters, especially in multiphase configurations, to ensure current balance between phases, prevent overcurrent, and enhance system stability and reliability.

One of the advantages of the present invention is that by adjusting the RC filter corner frequency, the self-subtracted current sensor can effectively extract the full waveform or direct current information of the inductor current, thereby facilitating modulation or phase current balance.

One of the advantages of the present invention is that it is a new type of on-chip current sensor that operates using a chip-based $R_{LG}$ current sensing method, wherein $R_{LG}$ is the on-resistance of the low-side power switch.

One of the advantages of the present invention is that by accurately matching the upper power switch on-resistance and the lower power switch on-resistance, it ensures accurate inductor current extraction. The developed self-subtracted current sensor can be used to balance multiphase buck converters, eliminating the need for the conventional bulky off-chip current sensors to match filters, and match the inductor direct current resistance current sensing.

One of the advantages of the present invention is the use of small on-chip resistors and capacitors, which can comprehensively sense full-wave inductor current information, enabling easy on-chip integration.

One of the advantages of the present invention is the proposal of a simple gating circuit to reduce sensing errors caused by dead-time, unlike conventional MOS current mirror sensing or switch node ($V_{LX}$) filtering methods, the invention can effectively reduce sensing errors.

One of the advantages of the present invention is the integration of sensing technology into existing dual-phase monolithic buck converters, combined with the functionality of an adaptive on-time controller. When the load current range is from 1.2 A to 2.6 A, it achieves a low current error of less than 50 mA, with an impedance difference between the two phases of 30 mOhm, reducing current balance errors by 71%.

A self-subtracted current sensor of the present invention is used to sense a conversion unit, with input voltage and duty cycle, the invention includes: a switching node connected to the conversion unit, a sensing inductor connected to the switching node, and a sensing resistor connected to the sensing inductor and the conversion unit.

A self-subtracted current sensor of the present invention, wherein the conversion unit is a buck converter.

The buck converter of the present invention, comprising: an upper bridge switch connected to the input voltage, the upper bridge switch having an upper bridge resistance; a lower bridge switch connected to the upper bridge switch, the lower bridge switch having a lower bridge resistance, and the upper bridge switch and the lower bridge switch having the switching node therebetween; and a driver connected to the upper bridge switch and the lower bridge switch; wherein, the sensing gain is equal to the lower bridge resistance, the product of the duty cycle and the input voltage minus the switching node, which is equal to the sensing inductor voltage, and is equal to the lower bridge resistance and the inductor current.

A self-subtracted current sensor of the present invention, wherein the conversion unit is a monolithic multiphase buck converter.

The monolithic multiphase buck converter of the present invention comprises a master phase and a slave phase: the master phase includes a self-subtracted current sensor, a first low-pass filter, a second low-pass filter, and a first chopper transistor, the input voltage and the duty cycle are input to the first low-pass filter, the product of the input voltage and the duty cycle is connected to the first low-pass filter, the switching node is input to the second low-pass filter, the first chopper transistor is connected to the first low-pass filter, and the second low-pass filter is connected to the second low-pass filter switching node, connected to the first chopper transistor, and transferring to the inductor current.

A self-subtracted current sensor of the present invention, the slave phase comprises a slave-phase self-subtracted current sensor, a third low-pass filter, a fourth low-pass filter, and a second chopper transistor. The input voltage and the second duty cycle are input to the third low-pass filter. The product of the input voltage and the second duty cycle is connected to the third low-pass filter. The second switching node is input to the fourth low-pass filter. The second chopper transistor is connected to the third low-pass filter and the fourth low-pass filter. The second switching node is connected to the fourth low-pass filter, and then connected to the second chopper transistor to become the second inductor current. Wherein, the error inductor current is obtained by subtracting the second inductor current from the inductor current.

One embodiment of the self-subtracted current sensor of the present invention, comprising a sensing inductor connected to the second low-pass filter, a sensing resistor connected to the sensing inductor, and an output voltage connected to the sensing resistor.

Another embodiment of the self-subtracted current sensor of the present invention, comprising a second sensing inductor connected to the fourth low-pass filter, a second sensing resistor connected to the second sensing inductor, and an output voltage connected to the second sensing resistor.

Another embodiment of the self-subtracted current sensor of the present invention, comprising a slave-phase self-subtracted current sensor, comprising an adaptive on-time controller. The adaptive on-time controller generates on-time periods for the master phase and the slave phase, wherein, the error inductor current is used to adjust the on-time duration of the slave phase. When the second inductor current of the slave phase is smaller, the on-time duration of the slave phase is extended, to increase the second inductor current of the slave phase, in order to balance the current.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
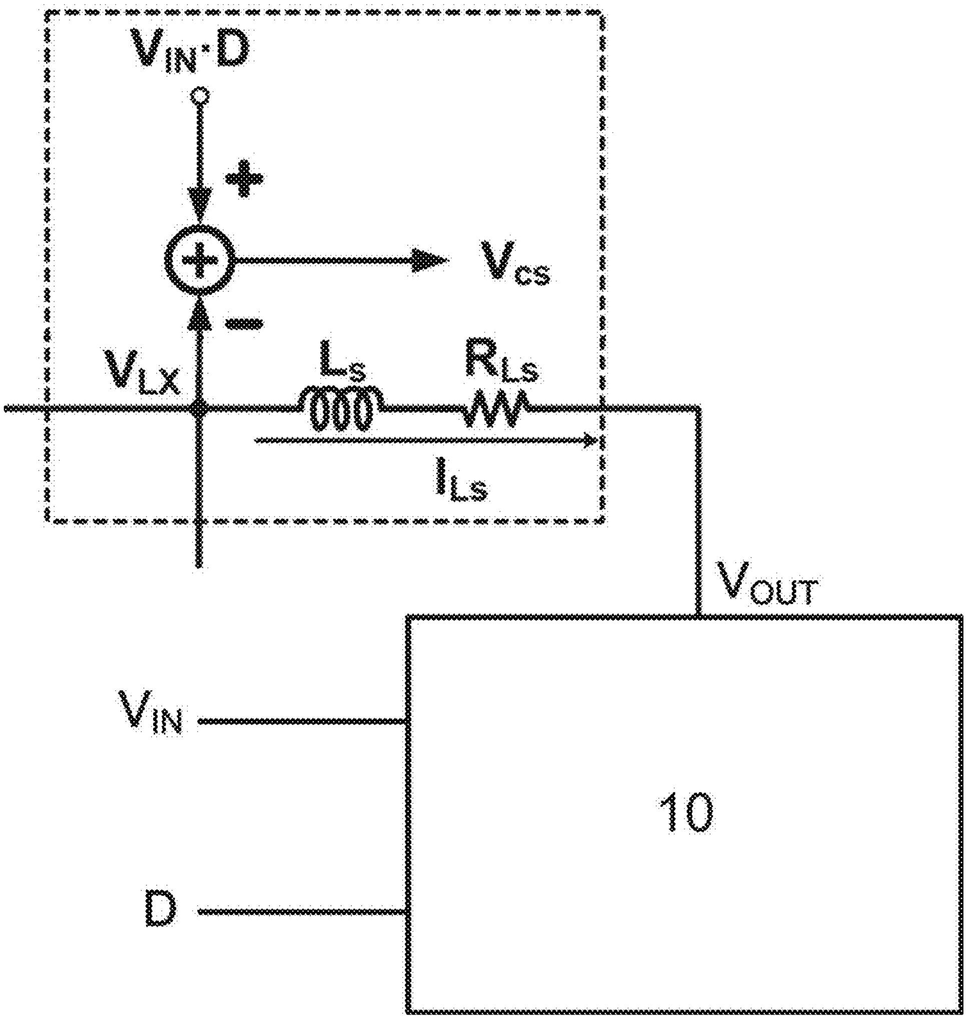
FIG. 1: Schematic diagram of the self-subtracted current sensor of the present invention.
Figure 2:
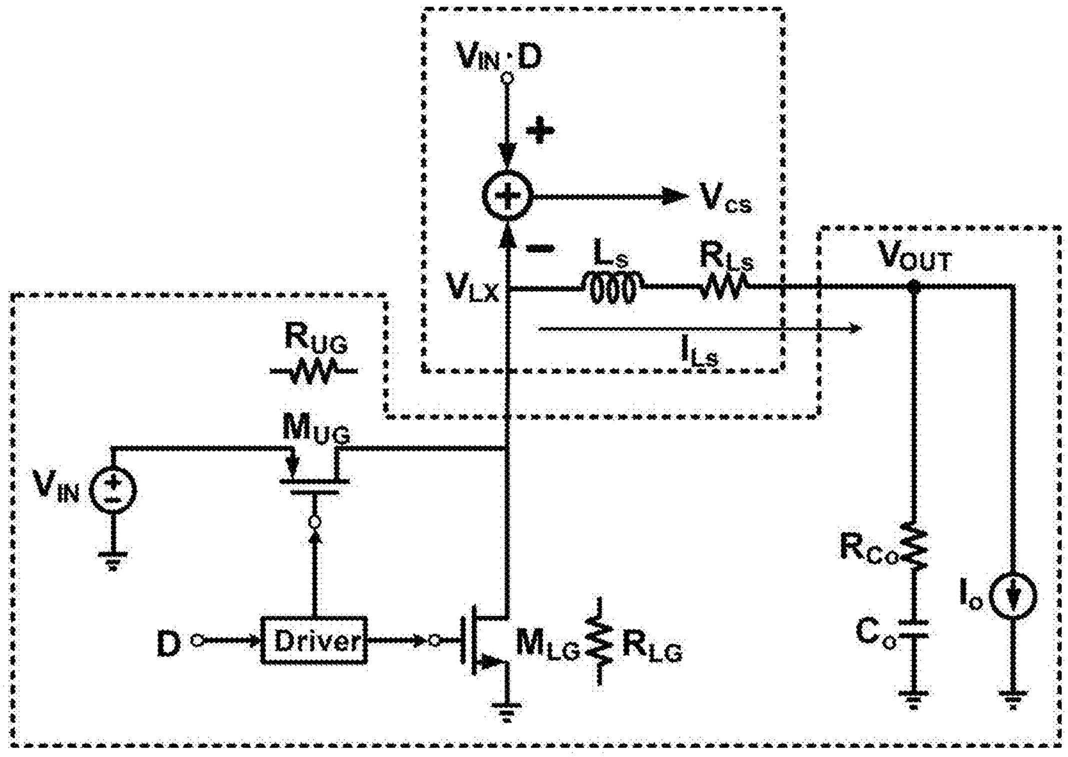
FIG. 2: Schematic diagram of the circuit of the self-subtracted current sensor of the present invention.

FIG. 1 shows a schematic diagram of the self-subtracted current sensor of the present invention, and FIG. 2 shows a schematic diagram of the circuit for the self-subtracted current sensor of the present invention, please refer to both FIG. 1 and FIG. 2. As shown in FIG. 1, the present invention proposes a self-subtracted current sensor 11, which is suitable for use in a buck converter 10, i.e., a conversion unit 10. The self-subtracted current sensor 11 can be used to sense the conversion unit 10. The conversion unit 10 comprises an input voltage $V_{IN}$ and a duty cycle D. The self-subtracted current sensor 11 comprises: a switching node $V_{LX}$, connected to the conversion unit 10; a sensing inductor $L_s$, connected to the switching node $V_{LX}$; and, a sensing resistor $R_{LS}$, connected to the sensing inductor $L_s$ and the conversion unit 10, and the inductor current $I_{Ls}$.

FIG. 2 shows a schematic diagram of the circuit for the self-subtracted current sensor of the present invention. The buck converter 11 comprises an upper bridge switch $M_{UG}$, a lower bridge switch $M_{LG}$, and a driver 102, wherein, the driver 102 is connected to the upper bridge switch $M_{UG}$ and the lower bridge switch $M_{LG}$. The duty cycle D can be transmitted to the driver 102, which is connected to drive the upper bridge switch $M_{UG}$. The upper bridge switch $M_{UG}$ is connected to the input voltage $V_{IN}$, and the upper bridge switch $M_{UG}$ has an upper bridge resistance $R_{UG}$. The lower bridge switch $M_{LG}$ is connected to the upper bridge switch $M_{UG}$, and the lower bridge switch $M_{LG}$ has a lower bridge resistance $R_{LG}$. The switching node $V_{LX}$ is between the upper bridge switch $M_{UG}$ and the lower bridge switch $M_{LG}$. Both the upper bridge switch $M_{UG}$ and the lower bridge switch $M_{LG}$ are made of metal-oxide-semiconductor.

In the circuit diagram for the self-subtracted current sensor of the present invention shown in FIG. 2, the sensing gain is equal to the lower bridge resistance $R_{LG}$. The product of the duty cycle D, and the input voltage $V_{IN}$ minus the switching node $V_{LX}$, which is equal to the sensing inductor voltage $V_{CS}$, which also is equal to the lower bridge resistance $R_{LG}$ and the inductor current $I_{Ls}$.

In the circuit diagram for the self-subtracted current sensor of the present invention shown in FIG. 2, the inductor current $I_{Ls}$ flows through the sensing inductor $L_s$, and through the sensing resistor $R_{LS}$, and continues to flow through the output voltage $V_{OUT}$. The output voltage $V_{OUT}$ is connected to an output resistor $R_{CO}$ and finally connected to an output capacitor $C_O$ grounded, wherein, there is an output current $I_O$ flowing, and the output voltage $V_{OUT}$ is also connected to the load.

In the circuit diagram for the self-subtracted current sensor of the present invention shown in FIG. 2, in the buck converter 10, the self-subtracted current sensor 11 is connected between the upper bridge switch $M_{UG}$ and the upper bridge resistance $R_{UG}$, and is connected to the sensing inductor $L_s$, generating the switching node $V_{LX}$. The self-subtracted current sensor 11 subtracts the product of the duty cycle D and the input voltage $V_{IN}$ from the switching node $V_{LX}$, to generate the sensing gain, which is equal to the resistance $R_{LG}$.

Furthermore, in the circuit diagram for the self-subtracted current sensor of the present invention shown in FIG. 2, based on the basic steady-state analysis of the buck converter, considering the upper bridge resistance $R_{UG}$, the parasitic resistance $R_{LG}$, and the resistance $R_L$ on the upper bridge switch $M_{UG}$ connected to the inductor direct current resistance (DCR), the input voltage $V_{IN}$ multiplied by the duty cycle D, as shown in step (1). Additionally, the average value of the switching node $V_{LX}$ is derived from step (2), wherein. the current $I_{Ls}$ is the direct current (DC) component of the current $i_{Ls}$:

$$V_{IN} \cdot d = V_{IN} \cdot \frac{V_{OUT} + I_{Ls} \cdot (R_{Ls} + R_{LG})}{V_{IN} + I_{Ls} \cdot (R_{LG} - R_{UG})} \quad \text{Step (1)}$$

-continued $$V_{LX}=I_{Ls}\cdot R_{Ls}+V_{OUT} \quad \text{Step (2)}$$

Design the upper bridge resistor $R_{UG}$ to be equal to the $R_{LG}$ chip type, enabling the acquisition of $V_{IN\text{-}d}$ (i.e., D), as shown in step (3):

$$V_{IN}\cdot d=V_{OUT}+I_{Ls}\cdot(R_{Ls}+R_{LG}) \quad \text{Step (3)}$$

From the direct current inductor current $I_{Ls}$, sensing can be performed by subtracting $V_{LX}$ from $V_{IN}$·d (i.e., D), resulting in $V_{CS}$, as shown in step (4). It can also be seen that the DC value of the sensing signal, sensing inductance voltage $V_{CS}$ and the sensing gain, which is proportional to the DC inductor current $I_{Ls}$ of $R_{LG}$:

$$v_{CS}=V_{IN}\cdot d-V_{LX}=I_{Ls}\cdot R_{LG} \quad \text{Step (4)}$$

The representation of $V_{LX}$ in the time domain for the on-time and off-time is shown in steps (5) and (6), respectively:

$$v_{LX}|_{d}=V_{IN}-i_{Ls}R_{UG}=V_{IN}-i_{Ls}R_{LG} \quad \text{Step (5)}$$

$$v_{LX}|_{1-d}=-i_{Ls}R_{LG} \quad \text{Step (6)}$$

By subtracting (5) and (6) from $V_{IN}$ and 0, respectively (which essentially represents the meaning of $V_{IN}$·d), i.e., the subtraction of the product of the duty cycle D and the input voltage $V_{IN}$ from the switching node $V_{LX}$, the sensing inductance voltage $V_{CS}$, and the sensing gain are proportional to the inductor current $I_{Ls}$ of $R_{LG}$. Therefore, it can be concluded that the entire inductor waveform has been sensed.

Since the current balancing loop aims to balance all sensing currents of multi-phase current balance applications, the sensing accuracy depends on the matching of the sensing gains of the dual-phase buck converter example, as described in step (7):

$$V_{CS1}=V_{CS2}\rightarrow I_{Ls1}R_{CS1}=I_{Ls2}R_{CS2}\rightarrow\Delta I_{Ls}=I_{Ls1}\left(1-\frac{R_{CS1}}{R_{CS2}}\right) \quad \text{Step (7)}$$

The self-subtracted current sensing method of the present invention can ensure chip-level matching accuracy for each phase sensing gain, such as $R_{CS1}=R_{CS2}=R_{LG}$. In contrast, methods that have sensing gains (such as $R_{CS1,2}$ equal to DCR) associated with inductor direct current resistance (DCR) are too sensitive to temperature and each phase's printed circuit board routing traces, resulting in inaccurate balancing performance.

Figure 3:
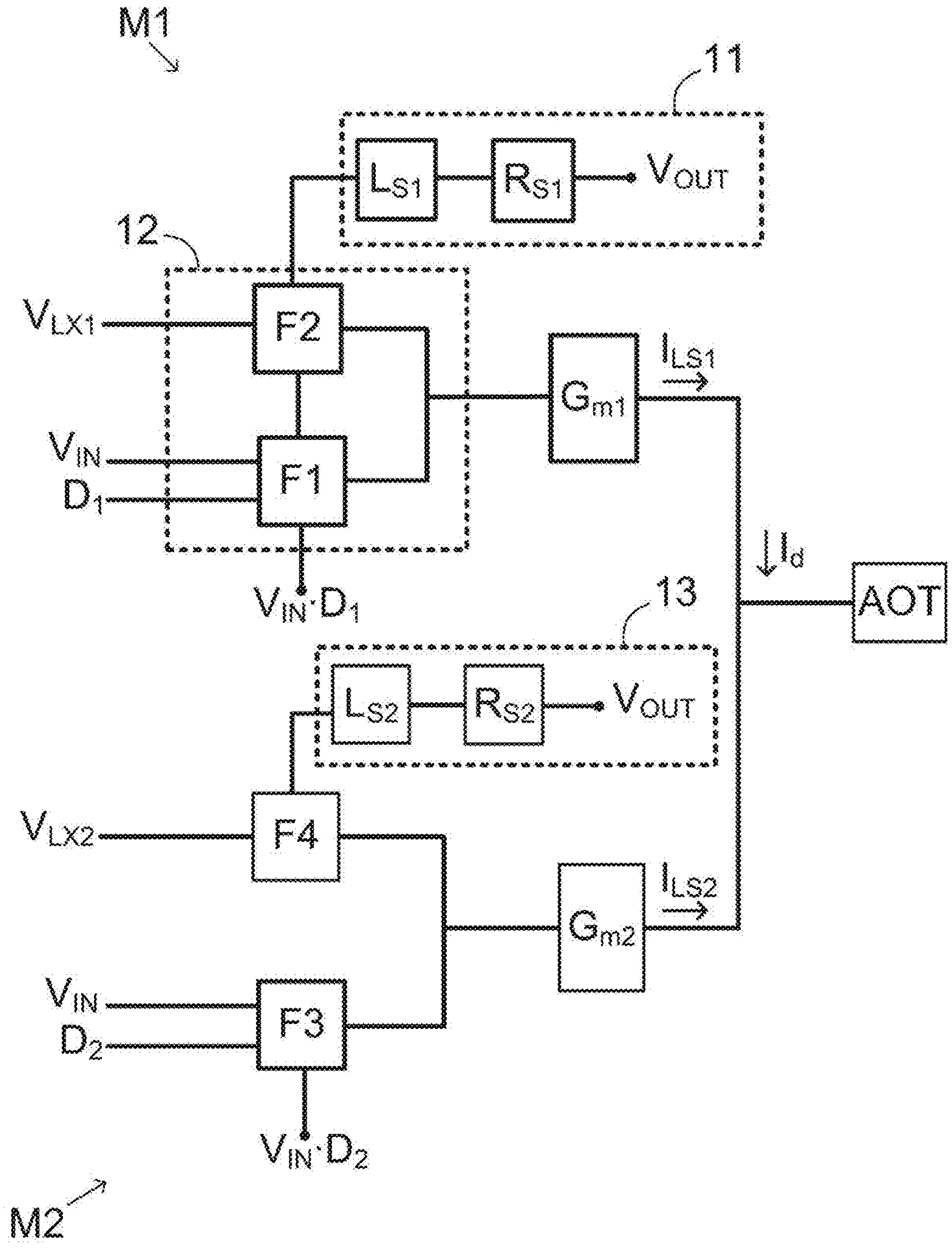
FIG. 3: Schematic diagram of the circuit of another embodiment for the self-subtracted current sensor of the present invention.

FIG. 3 depicts another embodiment for the self-subtracted current sensor circuit of the present invention, which can be applied to a single-chip multiphase step-down buck converter and maintain current balance. It includes an input voltage $V_{IN}$, a first duty cycle $D_1$, the product of the input voltage $V_{IN}$ and the first duty cycle $D_1$, connected to a first low-frequency oscillator F1, and further connected to a first chopper $G_{m1}$, with a second low-frequency oscillator F2 connected to a second chopper $G_{m2}$.

In the self-subtracted current sensor circuit for another embodiment of the present invention shown in FIG. 3, the single-chip multiphase step-down buck converter includes a main phase M1 and a secondary phase M2: the main phase M1 includes the self-subtracted current sensor 11, the first low-pass filter F1, the second low-pass filter F2, and the first chopper $G_{m1}$, with the input voltage $V_{IN}$, and the first duty cycle $D_1$ inputted to the first low-pass filter F1, the product of the input voltage $V_{IN}$ and the first duty cycle $D_1$ connected to the first low-pass filter F1, the first switching node $V_{LX1}$ inputted to the second low-pass filter F2, and the first chopper $G_{m1}$ connected to the first low-pass filter F1, and the second low-pass filter F2. The first switching node $V_{LX1}$ passes through the second low-pass filter F2 and is then converted into the first inductor current $I_{Ls1}$ by the first chopper $G_{m1}$. The dashed line 12 indicates the region of the dual low-pass filter, including the positions of the first low-pass filter F1 and the second low-pass filter F2, which are marked to be more prominent.

In the self-subtracted current sensor circuit for another embodiment of the present invention shown in FIG. 3, the secondary phase M2 includes a secondary self-subtracted current sensor 13, a third low-pass filter F3, a fourth low-pass filter F4, and a second chopper $G_{m2}$. The input voltage $V_{IN}$ and the second duty cycle D2 are inputted to the third low-pass filter F3. The product of the input voltage $V_{IN}$ and the second duty cycle $D_2$ is connected to the third low-pass filter F3. The second switching node $V_{LX2}$ is inputted to the fourth low-pass filter F4. The second chopper $G_{m2}$ is connected to the third low-pass filter F3, and the fourth low-pass filter F4. The second switching node $V_{LX2}$ passes through the fourth low-pass filter F4 and is then converted into the second inductor current $I_{Ls2}$ by the second chopper $G_{m2}$. Subtracting the first inductor current $I_{Ls1}$ from the second inductor current $I_{Ls2}$ can yield the error inductor current $I_d$.

In the self-subtracted current sensor circuit for another embodiment of the present invention shown in FIG. 3, the output voltage $V_{OUT}$, the second sensing inductor $L_{s2}$ connected to the second low-pass filter F2, and the second sensing resistor $R_{Ls2}$ connected to the second sensing inductor $L_{s2}$ are included. The output voltage $V_{OUT}$ is connected to the second sensing resistor $R_{LS2}$.

In the self-subtracted current sensor circuit for another embodiment of the present invention shown in FIG. 3, the self-subtracted current sensor 13 includes a second sensing inductor $L_{s2}$, a second sensing resistor $R_{LS2}$, wherein the second sensing inductor $L_{s2}$ is connected to the fourth low-pass filter F4, and the second sensing resistor $R_{LS2}$ is connected to the second sensing inductor $L_{s2}$, and the output voltage $V_{OUT}$ is connected to the second sensing resistor $R_{LS2}$.

In the self-subtracted current sensor circuit of another embodiment of the present invention shown in FIG. 3, the self-subtracted current sensor 13 includes an adaptive on-time buck converter (AOT) that generates the on-time period of the main phase and the secondary phase, wherein, the error inductor current $I_d$ can be used to adjust the on-time duration of the secondary phase. When the inductor current $I_{Ls2}$ of the secondary phase M2 is smaller, the on-time duration of the secondary phase M2 is extended to increase the inductor current $I_{Ls2}$ of the secondary phase M2 to balance the current.

In the self-subtracted current sensor circuit for another embodiment of the present invention shown in FIG. 3, the sensing gain is equal to the lower bridge resistor $R_{LG}$ by adjusting the cutoff frequency of the low-frequency oscillator. The self-subtracted current sensor effectively extracts the complete waveform or DC information of the inductor current, which assists in phase current balancing. Furthermore, precise matching of the resistances of the upper and lower power switches ensures accurate inductor current extraction. In the circuit of the present invention, two low-pass filters shape the square wave of the input voltage $V_{IN}$ and the product of the input voltage $V_{IN}$ and the duty cycle D, respectively, reducing the need for a high-bandwidth amplifier. The present invention senses the inductor current by changing the RC filter cutoff frequency from the average value to the full waveform.

In the self-subtracted current sensor circuit for another embodiment of the present invention shown in FIG. 3, a low-pass filter with an operating frequency of approximately 250 kHz reduces passive components by 100 times compared to a matching filter for inductor direct current resistance current sensing methods. As a result, the minimization of chip space is achieved for easier integration. Additionally, the circuit also includes a chopper trans-conductor that eliminates mismatch voltage and converts the detection voltage into current to achieve balance.

The present invention is a self-subtracted current sensor that can be applied to a single-chip multiphase step-down buck converter to effectively extract the complete waveform or DC information of the inductor current, facilitate modulation or phase current balancing, accurately match the on-resistance of the upper and lower power switches, ensure accurate inductor current extraction, eliminate the need for large matching filters, and improve current balance accuracy. Current detection is crucial in step-down buck converters, especially in multi-phase configurations, to ensure inter-phase current balance, prevent overcurrent, and enhance system stability and reliability.

It is understood that various modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A self-reducing current sensor for sensing a conversion unit, having an input voltage ($V_{in}$) and a duty cycle (D), comprising:

a switching node ($V_{Lx}$) connected to a conversion unit;

a sensing inductance voltage ($V_{CS}$) connected to said switching node ($V_{Lx}$); and a sensing resistor ($R_{LS}$) connected to said sensing inductance voltage ($V_{CS}$) and said conversion unit, with an inductance current ($I_{Ls}$) flowing through said sensing inductance voltage ($V_{CS}$) and said sensing resistor ($R_{LS}$), wherein, a product of a duty cycle (D) and an input voltage ($V_{in}$) minus said switching node ($V_{Lx}$) to generate a sensing gain, wherein, an upper bridge resistance ($R_{UG}$), a parasitic resistance ($R_{LG}$), and a resistance ($R_L$) on an upper bridge switch ($M_{UG}$) connected to an inductor direct current resistance, said input voltage ($V_{IN}$) multiplied by said duty cycle (D) as, $$\nabla_{IN} \cdot d = \nabla_{IN} \cdot \frac{V_{OUT} + I_{Ls} \cdot (R_{Ls} + R_{LG})}{\nabla_{IN} + I_{Ls} \cdot (R_{LG} - R_{UG})} \quad \text{step 1}$$

an average value of said switching node ($V_{LX}$) being derived from said step 2, a current ($I_{Ls}$) being said direct current component of said current ($I_{Ls}$) as, $$V_{LX} = I_{Ls} \cdot R_{Ls} + V_{OUT} \quad \text{step 2}$$

an upper bridge resistor ($R_{UG}$) to be equal to a parasitic resistance ($R_{LG}$) chip type, enabling an acquisition of $V_{IN \cdot d}$ (D) as, $$V_{IN} \cdot d = V_{OUT} + I_{Ls} \cdot (R_{Ls} + R_{LG}). \quad \text{step 3}$$

2. The self-reducing current sensor according to claim 1, wherein said conversion unit comprises a buck converter.

3. The self-reducing current sensor according to claim 2, wherein the buck converter comprises:

an upper bridge switch connected to said input voltage, having an upper bridge resistor;

a lower bridge switch connected to said upper bridge switch, having a lower bridge resistor, with a switching node ($V_{Lx}$) between said upper bridge switch and said lower bridge switch; and a driver connected to said upper bridge switch and said lower bridge switch, wherein, said sensing gain being equal to said lower bridge resistor, a product of a duty cycle (D) and an input voltage minus a switching node ($V_{Lx}$) being equal to a sensing inductance voltage, being equal to said lower bridge resistor and an inductance current, wherein, from a direct current inductor current ($I_{Ls}$), sensing by subtracting said switching node ($V_{LX}$) from $V_{IN \cdot d}$, resulting in a sensing inductance voltage ($V_{CS}$), a DC value of a sensing signal, sensing said sensing inductance voltage ($V_{CS}$) and a sensing gain, which being a proportional to a DC inductor current ($I_{Ls}$) of said parasitic resistance ($R_{LG}$) as, $$v_{CS} = V_{IN} \cdot d - V_{LX} = I_{Ls} \cdot R_{LG} \quad \text{Step 4}$$

a representation of $V_{LX}$ in the time domain for an on-time and off-time being in Steps 5 and Step 6 as, $$v_{LX}|_d = V_{IN} - i_{Ls} R_{UG} = V_{IN} - i_{Ls} R_{LG} \quad \text{Step 5}$$

$$v_{LX}|_{1-d} = -i_{Ls} R_{LG} \quad \text{Step 6}$$

by subtracting said Step 5 and Step 6 from $V_{IN}$ and 0, a subtraction of said product of said duty cycle (D) and said input voltage ($V_{IN}$) from said switching node ($V_{LX}$), said sensing inductance voltage ($V_{CS}$), and said sensing gain being a proportional to an inductor current ($I_{Ls}$) of said parasitic resistance ($R_{LG}$).

4. The self-reducing current sensor according to claim 3, wherein said upper bridge switch and said lower bridge switch are made of metal-oxide-semiconductor.

5. The self-reducing current sensor according to claim 1, wherein said conversion unit comprises a single-chip multi-phase buck converter.

6. The self-reducing current sensor according to claim 5, wherein a multi-phase buck converter comprises a main phase and a secondary phase:

a main phase comprising a self-reducing current sensor, a first low-pass filter, a second low-pass filter and a first chopper transistor, with an input voltage and a duty cycle inputted to a first low-pass filter, a product of said input voltage and said duty cycle connected to said first low-pass filter, a switching node inputted to said second low-pass filter, said first chopper transistor connected to said first low-pass filter and said second low-pass filter, said switching node connected through said second low-pass filter, connected through said first chopper transistor to convert into an inductance current;

a secondary phase comprising a secondary self-reducing current sensor, a third low-pass filter, a fourth low-pass filter, and a second chopper transistor, an input voltage and a second duty cycle inputted to the third low-pass filter, a product of said input voltage and the second duty cycle connected to said third low-pass filter, a second switching node inputted to said fourth low-pass filter, said second chopper transistor connected to said third low-pass filter and said fourth low-pass filter, said second switching node connected through said fourth low-pass filter, connected through said second chopper transistor to convert into a second inductance current, wherein, subtracting said inductance current from said second inductance current, yielding an error inductor current, a current balancing loop aiming to balance all sensing currents of multi-phase current balance application, a sensing accuracy depending on a matching of said sensing gain of a dual-phase buck converter, as $$V_{CS1} = V_{CS2} \rightarrow I_{Ls1}R_{CS1} = I_{Ls2}R_{CS2} \rightarrow \Delta I_{Ls} = I_{Ls1}\left(1 - \frac{R_{CS1}}{R_{CS2}}\right). \quad \text{Step 7}$$

7. The self-reducing current sensor according to claim 6, further comprises an output voltage, a sensing inductance being connected to a second low-pass filter, a sensing resistor being connected to said sensing inductance, and said output voltage being connected to said sensing resistor.

8. The self-reducing current sensor according to claim 6, further comprises a second sensing inductance, a second sensing resistor, wherein said second sensing inductance being connected to a fourth low-pass filter, said second sensing resistor being connected to said second sensing inductance, and an output voltage being connected to said second sensing resistor.

9. The self-reducing current sensor according to claim 6, further comprises an adaptive on-time buck converter, said adaptive on-time buck converter generates on-time periods for a main phase and a secondary phase, wherein, an error inductor current being used to adjust an on-time duration of said secondary phase, when a second inductance current of said secondary phase being smaller, extending said on-time duration of said secondary phase to increase said second inductance current of said secondary phase to balance a current.

* * * * *